(12) United States Patent
Tanabe (10) Patent No.: US 6,731,394 B1
(45) Date of Patent: *May 4, 2004

(54) CONTROLLING THE DRAWING ABILITY OF THE PRINTERS CONNECTED TO A COMMUNICATION MEDIUM

(75) Inventor: Ritsushi Tanabe, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,907

(22) Filed: Dec. 22, 1997

(30) Foreign Application Priority Data

Dec. 27, 1996 (JP) .............................................. 8/351015

(51) Int. Cl.[7] .............................................. G06K 15/00
(52) U.S. Cl. ...................................... 358/1.13; 358/1.1
(58) Field of Search ................................. 395/101, 109, 395/112, 114, 116, 653, 672, 673, 200.3, 200.31, 200.43, 200.57, 200.58; 358/500, 527, 1.1, 1.9, 1.13, 1.15, 1.16, 401, 407, 408, 409, 442, 501, 524; 400/61, 76; 713/100, 102, 103; 709/200, 201, 213, 227, 228

(56) References Cited

U.S. PATENT DOCUMENTS

| | | | | |
|---|---|---|---|---|
| 5,058,037 A | * | 10/1991 | Kageyama et al. | 395/116 |
| 5,220,674 A | * | 6/1993 | Morgan et al. | 395/200.53 |
| 5,228,118 A | * | 7/1993 | Sasaki | 395/112 |
| 5,303,336 A | * | 4/1994 | Kageyama et al. | 395/114 |
| 5,323,393 A | * | 6/1994 | Barrett et al. | 370/449 |
| 5,392,419 A | * | 2/1995 | Walton | 395/100 |
| 5,459,819 A | * | 10/1995 | Watkins et al. | 395/117 |
| 5,467,434 A | * | 11/1995 | Hower, Jr. et al. | 395/114 |
| 5,799,206 A | * | 8/1998 | Kitagawa et al. | 710/36 |

* cited by examiner

Primary Examiner—Gabriel Garcia
(74) Attorney, Agent, or Firm—Fitzpatrick, Cella, Harper & Scinto (57) ABSTRACT

A protocol control unit obtains a setting information file to be set to a drawing unit from one of a plurality of host computers at a certain timing, the setting information file is analyzed and converted into commands to be set to the drawing unit by a data surveillance unit, and the converted commands are transferred to the drawing unit by a command communication unit, thereby automating each setting operation item for the drawing unit of the printing apparatuses, in a situation wherein a plurality of host computers share printing apparatuses connected to a network.

11 Claims, 7 Drawing Sheets

STORAGE MEDIUM SUCH AS FD/CD-ROM

| DIRECTORY INFORMATION |
|---|
| FIRST DATA PROCESSING PROGRAM<br>PROGRAM CODE GROUP CORRESPONDING WITH<br>THE STEPS OF THE FLOWCHART SHOWN IN FIG. 4 |
| SECOND DATA PROCESSING PROGRAM<br>PROGRAM CODE GROUP CORRESPONDING WITH<br>THE STEPS OF THE FLOWCHART SHOWN IN FIG. 5 |
|  |

MEMORY MAP OF STORAGE MEDIUM

CONTROLLING THE DRAWING ABILITY OF THE PRINTERS CONNECTED TO A COMMUNICATION MEDIUM

BACKGROUND OF THE INVENTION

1. Field of the Invention

The present invention relates to an output control device, an output control method and a storage medium storing a program readable by computer, which device communicates via a certain communication medium with a plurality of host computers and also with output apparatuses having drawing units which draw image data capable of being output from the output unit based on output information from the plurality of host computers, and processes output requests.

2. Description of the Related Art

Known arrangements of output apparatuses such as printers or photocopiers connected to a network have been such wherein the user had to set the standard font, size, paper cassette, etc., for each output apparatus, using separate operating panels.

Recently, computer operating systems have developed, and printer drivers have accordingly come into widespread use. Thus, the user can set the printing settings using the printer driver program upon performing printing.

However, in the event of printing directly from UNIX or DOS, a printer driver is not used, so printing is performed based on the printing settings made at the output apparatus. Accordingly, the user has to change the settings from the operating panel of the output apparatus each time the font being used or the paper size is to be changed for printing. Also, there are arrangements wherein a user interface can be used from a host computer to change the settings of the output apparatus, but even with such arrangements, setting of the setting information has had to be performed separately for each output apparatus.

Accordingly, there has been the problem that administrator time and trouble are increased for each extra apparatus, since a network administrator overseeing many such output apparatuses needed to repeat the same setting procedure for each output apparatus.

SUMMARY OF THE INVENTION

The preset invention has been made in order to solve the above problems, and it is an object thereof to provide an output control device, an output control method and a storage medium storing a program readable by computer, capable of automating the operating of making various settings to the drawing unit of printing apparatuses in an arrangement wherein a plurality of host computers share printing apparatuses connected to a network, by means of obtaining from a host computer a setting information file to be set to the printing apparatuses and transferring this file to the drawing unit of the printing apparatus, thereby markedly decreasing the operational load on the administrator overseeing the printing apparatuses.

According to a first aspect of the present invention, an output control device, which communicates via a certain communication medium with a plurality of host computers and also with output apparatuses having drawing units which draw image data capable of being output from the output unit based on output information from the plurality of host computers and processes output requests, comprises: obtaining means for obtaining a setting information file to be set to the drawing unit from one of the host computers at a certain timing; converting means for analyzing the setting information file obtained by the obtaining means and converting it to commands to be set to the drawing unit; and communication means for transferring the aforementioned commands converted by the aforementioned converting means to the aforementioned drawing unit.

According to a second aspect of the preset invention, the output control device further comprises setting means for setting the host computer from which to obtain the setting information file at a certain timing. The obtaining means obtains the setting information file to be set to the drawing unit from the one host computer set by the setting means, at a certain timing.

According to a third aspect of the preset invention, the certain timing is upon startup of electrical power.

According to a fourth aspect of the preset invention, the certain timing is upon reception of a reset command from each host computer.

According to a fifth aspect of the preset invention, the certain timing is upon a reset instruction from the operating panel of the aforementioned output apparatus.

According to a sixth aspect of the present invention, an output control method, which involves communicating via a certain communication medium with a plurality of host computers and also with output apparatuses having drawing units which draw image data capable of being output from the output unit based on output information from the plurality of host computers and processes output requests, comprises: an obtaining step for obtaining a setting information file to be set to the drawing unit from one of the host computers at a certain timing; and a transferring step for analyzing the obtained setting information file and transferring commands to be set to the drawing unit, to the drawing unit.

According to a seventh aspect of the present invention, a storage medium stores a program readable by computer, which involves communicating via a certain communication medium with a plurality of host computers and also with output apparatuses having drawing units which draw image data capable of being output from the output unit based on output information from the plurality of host computers, the program stored by the storage medium comprising: an obtaining step for obtaining a setting information file to be set to the drawing unit from one of the host computers at a certain timing; and a transferring step for analyzing the obtained setting information file and transferring commands to be set to the drawing unit, to the drawing unit.

BRIEF DESCRIPTION OF THE DRAWINGS

FIG. 1, consisting of FIGS. 1A and 1B, is a block diagram describing the configuration of a printing system capable of the application of an output control device illustrating an embodiment of the present invention;

DESCRIPTION OF THE PREFERRED EMBODIMENTS

First Embodiment

Figures 1, 1B:
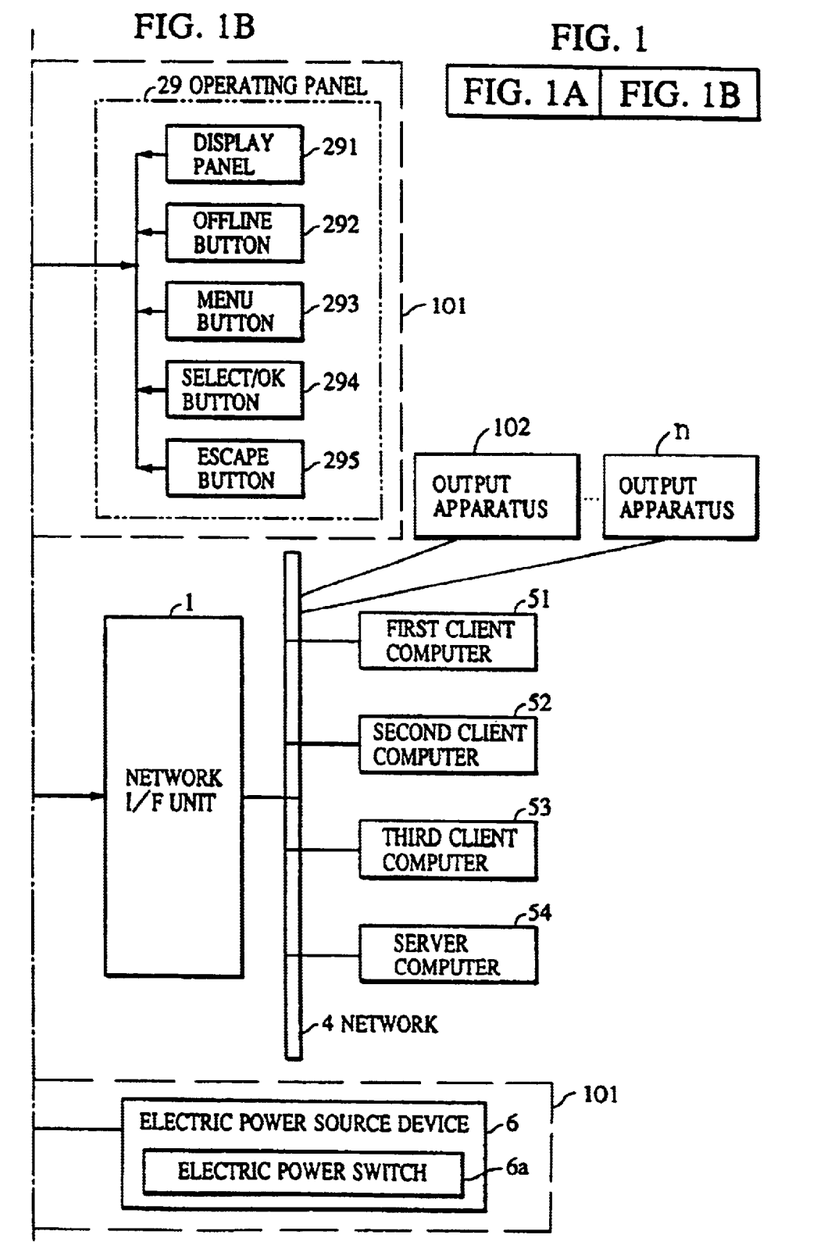
Figure 1A:
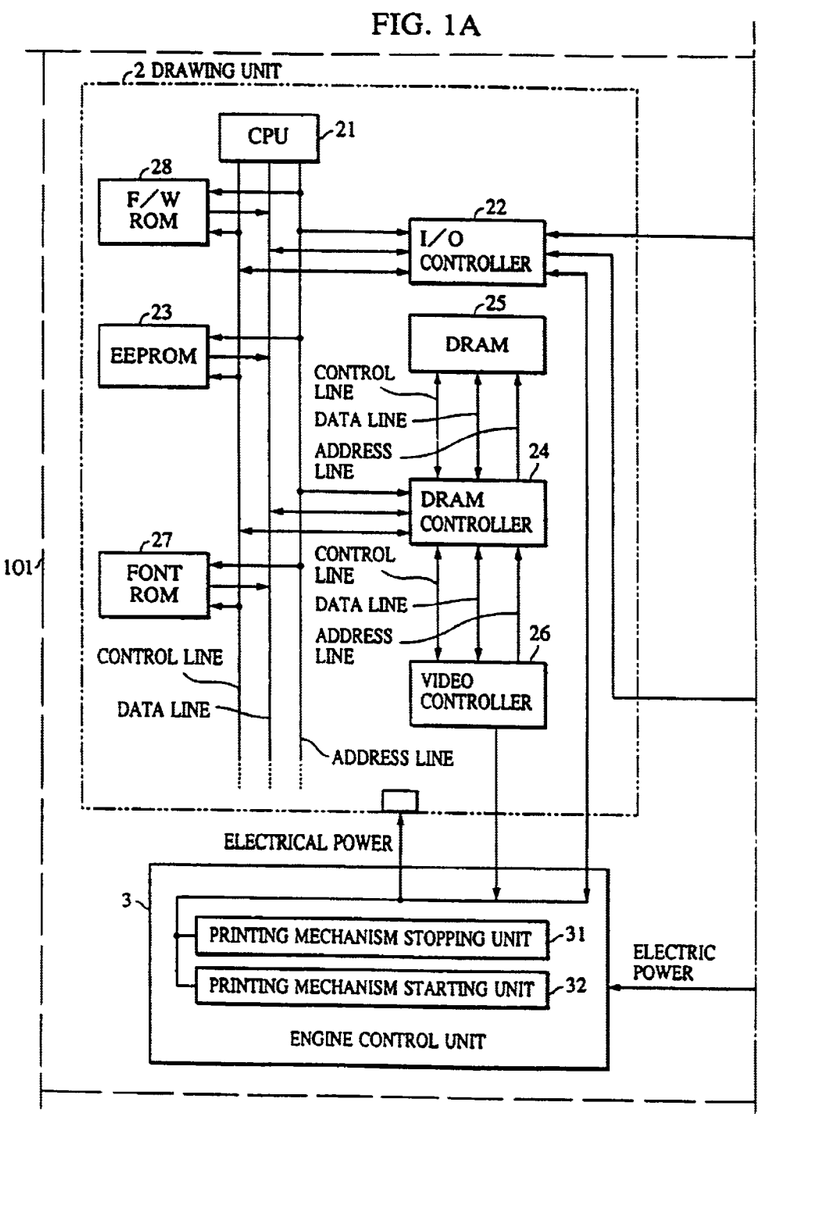

FIG. 1 is a block diagram describing the configuration of a printing system capable of application of an output control device, the interface 1, illustrating an embodiment of the present invention, together with an output apparatus 101. Additional output apparatuses 102, . . . , n are shown attached to the network 4. The first embodiment is comprised of: a network I/F unit 1 which receives drawing commands from a plurality of client computers 51 through 53 and server computer 54 connected by a network 4 and sends the drawing commands to the drawing unit 2; the drawing unit 2, which renders images in a DRAM 25 based on drawing commands received from this network I/F unit 1; an engine control unit 3 which receives image data from this drawing unit 2 and prints the data onto a recording medium by means of a printer 110; an operating panel 29 for performing various settings; and an electrical power supply device 6 having a power switch 6a.

Now, the engine control unit 3 comprises a printing mechanism stopping unit 31 which causes standby of the fuse, main memory, polygonal scanner, etc., for the printer in the event that a termination command has been received form the drawing unit 2, and a printing startup unit 32 which starts up these components and enables printing in the event that a printing command is received.

Also, the drawing unit 2 is comprised of an I/O controller 22 which performs sending and receiving of data from the operating panel 29 at which the printer user performs manual menu setting and from the network I/F unit 1, a DRAM 25 which temporarily records data, a DRAM controller 24 which controls the DRAM 25, EEPROM 23 which stores the contents set to the menu in a non-volatile manner, a font ROM 27 which stores font data, a video controller 26 which transfers data to the engine control unit 3, and a CPU 21 which performs processes according to the steps stored in a F/W ROM 28.

Further, the operating panel 29 comprises a display panel 291 for displaying the status of the printer of setting information such as the standard printer font, the size thereof, the paper tray, etc., an offline button 292 which switches between online and offline, a menu button 293 by which the operator instructs a setting request in the offline state, a select/OK button which the operator presses when selecting or confirming the contents of the menu of setting values, and an escape button 295 for returning to the immediately previous hierarchical menu.

Figure 2:
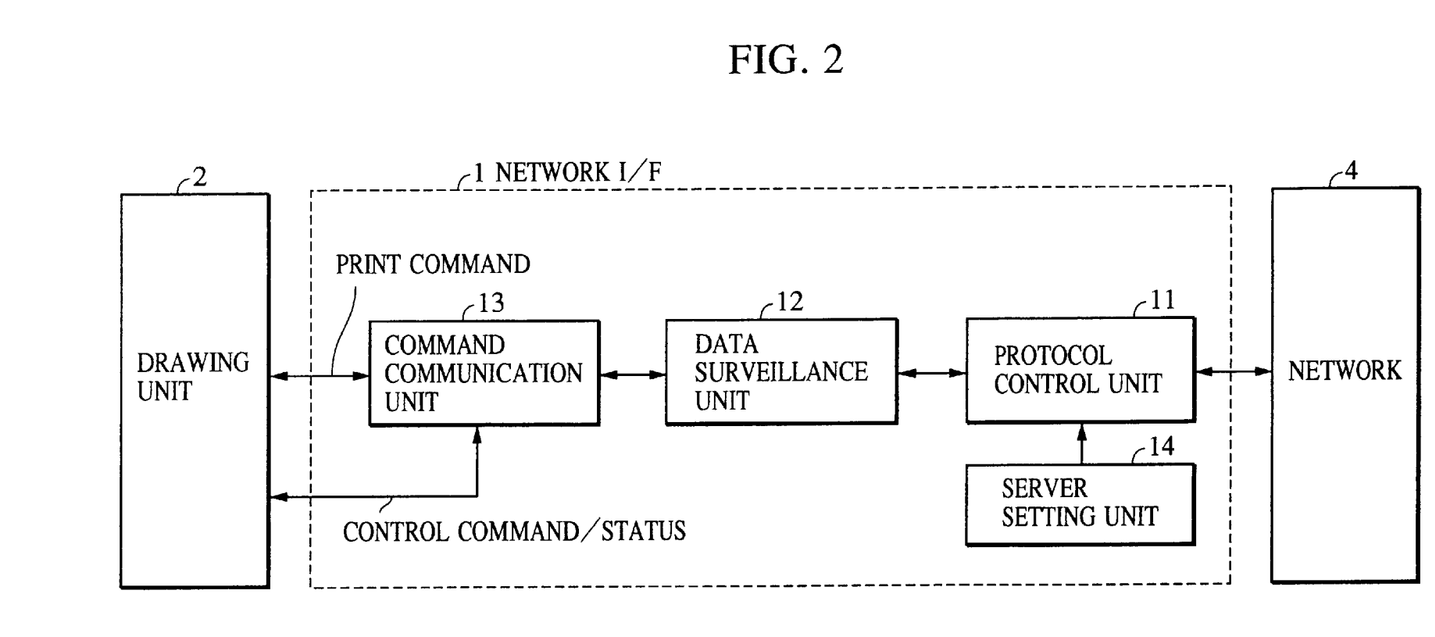
FIG. 2 is a block diagram describing the detailed configuration of the network I/F unit shown in FIG. 1.

FIG. 2 is a block diagram describing the detailed configuration of the network I/F unit shown in FIG. 1.

As shown in FIG. 2, the network I/F unit 1 comprises: a protocol control unit 11 which extracts the data portion of data packets received according to each respective packet's protocol; a data surveillance unit 12 which performs surveillance of the data from the protocol control unit 11, so that if the data is drawing commands or printer setting commands, the data is transferred without change, and if the data is an information setting file, the file is converted into printer setting commands and handed to the plurality of printers; a command communication unit 13 which performs communication for sending to the drawing unit 2 the commands sent from the data surveillance unit 12; and a server setting unit 14 which sets information specifying the server computer 54 having the setting information file.

First, description of the server setting operation for identifying the server computer 54 on which the printer setting information files reside will be made based on FIG. 3.

Figure 3:
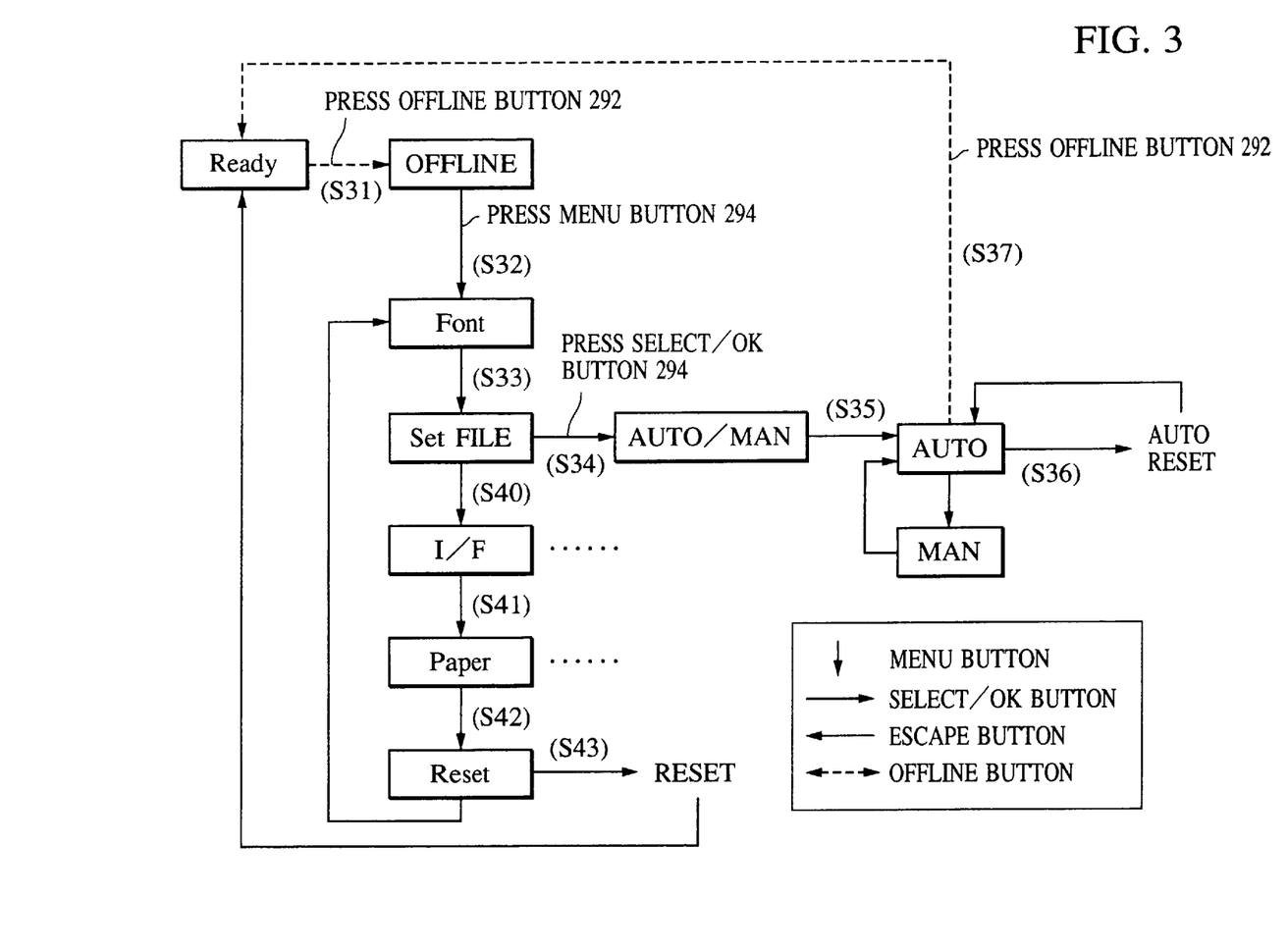
FIG. 3 is a chart diagram illustrating the server setting operation procedures for recognizing the server computer by means of the operation panel shown in FIG. 1.

FIG. 3 is a chart diagram illustrating the server setting operation procedures for recognizing the server computer by means of the operation panel shown in FIG. 1. In this Figure, (S31) through (S37) and (S40) through (S43) show the steps, "↓" indicates depressing of the menu button, "→" indicates depressing of the select/OK button, "←" indicates depressing of the escape button, and the broken arrow indicates depressing of the offline button.

The system enters the offline mode by depressing the offline button 292 of the operating panel 29 (S31). Next, depressing the menu button 293 displays each of the setting items on the display panel 291 (S32). Each time this menu button is pressed, the contents of each of the setting items change in a rotating manner. Selection of the setting items is performed by depressing the select/OK button 294 when the desired setting item is displayed.

In the event that the select/OK button 294 is pressed unintentionally, depressing the escape button 295 returns the system to the immediately prior hierarchical level. Here, depressing the menu button 292 twice from the OFFLINE display (S32, S33) changes the setting menu for the setting file displayed on the display panel 291 to "Set FILE".

Now, pressing the select/OK button 294 (S34) an AUTO/MAN display indicating the items for automatic and manual setting are displayed on the display panel 291. Further, pressing the select/OK button 294 (S35) at this time displays "AUTO". In the event that the user desires automatic setting, the select/OK button 294 is to be pressed, and if not, the display is changed to "MAN" by pressing the menu button 293 following which the select/OK button 294 is pressed. Here, the select/OK button 294 is pressed (S36) with "AUTO" displayed. At this time, "Selected" is temporarily displayed on the operating panel 29, and then the display returns to "AUTO".

Once the setting is completed, pressing the offline button 292 (S37) returns the system to the normally-used online state, and the display panel 291 displays "Ready".

On the other hand, in the event that the menu button 293 is depressed in step (S33), the display changes to that of interface setting (S40), if the menu button 293 is depressed again, the display changes to that of paper setting (S41), and in the event that the menu button 293 is depressed once more, "Reset" is displayed (S40), and in the event that the menu button 293 is depressed yet again, the display returns to step (S32), upon which depressing select/OK button 294 (S43) results in the "Ready" state.

Regarding the method of specifying the server computer upon which the setting information file resides, the server computer 54 is specified at the server setting unit 14 of the network I/F unit. Here, the assumed arrangement is such wherein hardware means such as dip-switches or the like are used for setting IP addresses, but if numerical value buttons or cursor buttons are provided on the operating panel 29 to allow for input of IP addresses, setting of the server computer 54 can be performed by the operating panel 29.

Also, the network administrator needs to login to the server computer 54 using a client computer 51, and place a setting information file created beforehand therein. The above processes are the steps relating to preparation of the setting information file.

The following is a description of the various means of the present embodiment and first through fifth aspects of the present invention, with reference to FIG. 1 and others.

According to a first aspect of the present invention, an output control device, which communicates via a certain communication medium (network 4) with a plurality of host computers (computers 51 through 54) and also with output apparatuses having drawing units which draw image data capable of being output from the output unit based on output information from the plurality of host computers and processes output requests, comprises: obtaining means (protocol control unit 11) for obtaining a setting information file to be set to the drawing unit (drawing unit 2) from one of the host computers at a certain timing; converting means (data surveillance unit 12) for analyzing the setting information file obtained by the obtaining means and converting it commands to be set to the drawing unit; and communication means (command communication unit 13) for transferring the commands converted by the converting means to the drawing unit. The protocol control unit 11 obtains a setting information file to be set to the drawing unit 2 from one of the host computers at a certain timing, the setting information file is analyzed and converted into commands to be set to the drawing unit by the data surveillance unit 12, and the converted commands are transferred to the drawing unit by the command communication unit 13. Thus, a setting information file to be set to the drawing unit can be obtained from one of the host computers at an appropriate timing as well as automating the setting of the various items regarding the drawing unit of the printing apparatus on the network, thereby greatly reducing the load of the setting operations of the various items corresponding to the printing apparatuses in order to match the requests from each host computer.

According to a second aspect of the present invention, the setting means (server setting unit 14) sets a host computer (e.g., server computer 54) from which to obtain the setting information file and the obtaining means (protocol control unit 11) obtains the setting information file at a certain timing, so that the candidate for the host computer from which to obtain the setting information file to be set to the drawing unit can be freely set, and can be obtained in a sure manner from the host computer regarding which a setting information file has been set to be set to the drawing unit, at an appropriate timing.

According to a third aspect of the present invention, the certain timing is made to be upon startup of electrical power, so that the information file to be set to the drawing unit can be obtained from the set host computer in a sure manner each time there is electrical power startup of the electrical power device 6.

According to a fourth aspect of the present invention, the certain timing is upon reception of a reset command from each host computer 51 through 54, so that the information file to be set to the drawing unit can be obtained from the set host computer in a sure manner each time there is reception of a reset command.

According to a fifth aspect of the present invention, the certain timing is upon a reset instruction from the operating panel of the output apparatus, so that the information file to be set to the drawing unit can be obtained from the host computer in a sure manner each time there is a reset instruction from the operating panel 29 of the output apparatus.

Now, the operation from the setting information file to the setting of each printer parameter will be described with reference to the flowcharts shown in FIG. 4 and FIG. 5.

Figure 4:
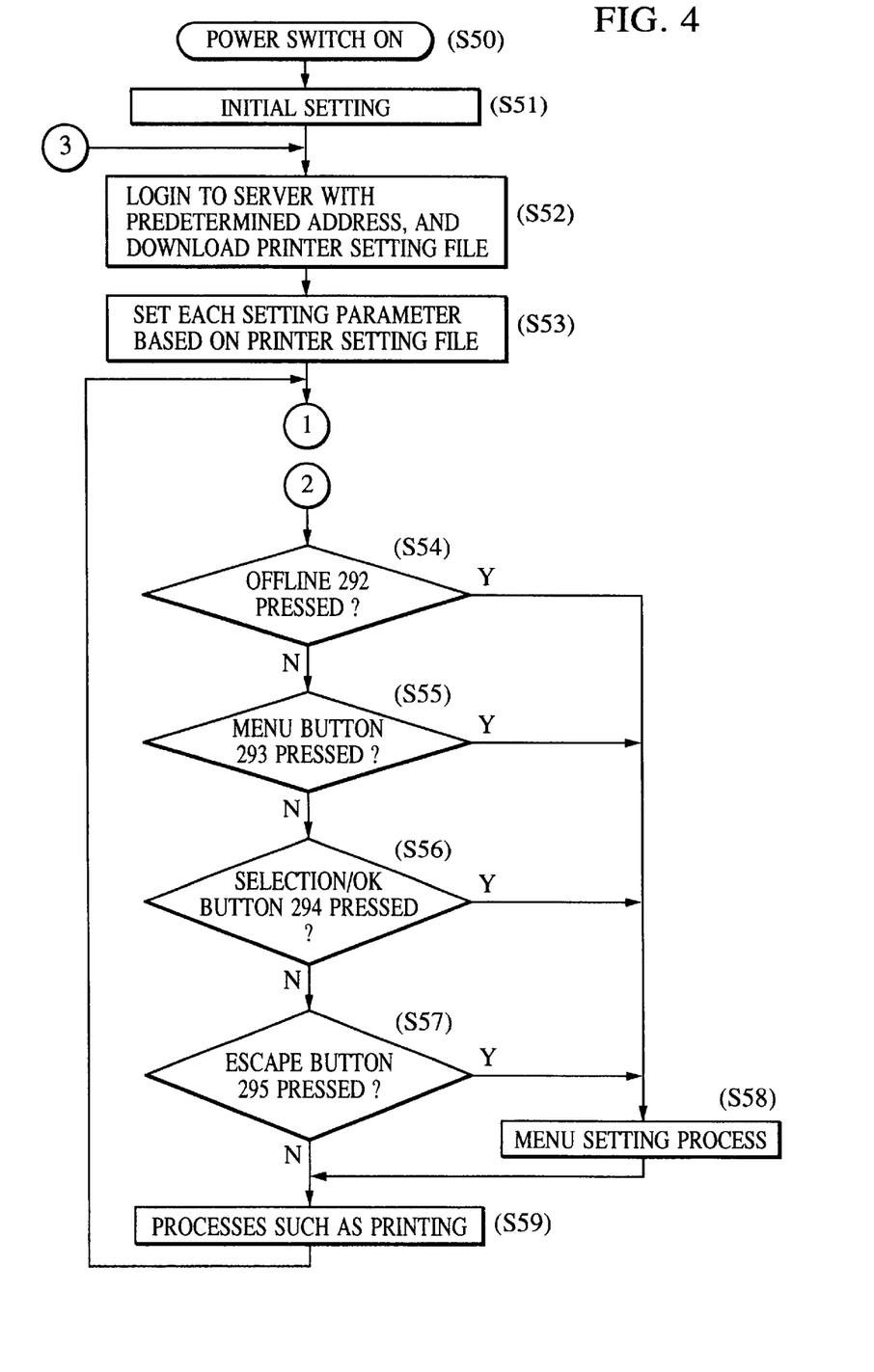
FIG. 4 is a flowchart illustrating an example of the data processing steps of the output control device relating to the present invention.
Figure 5:
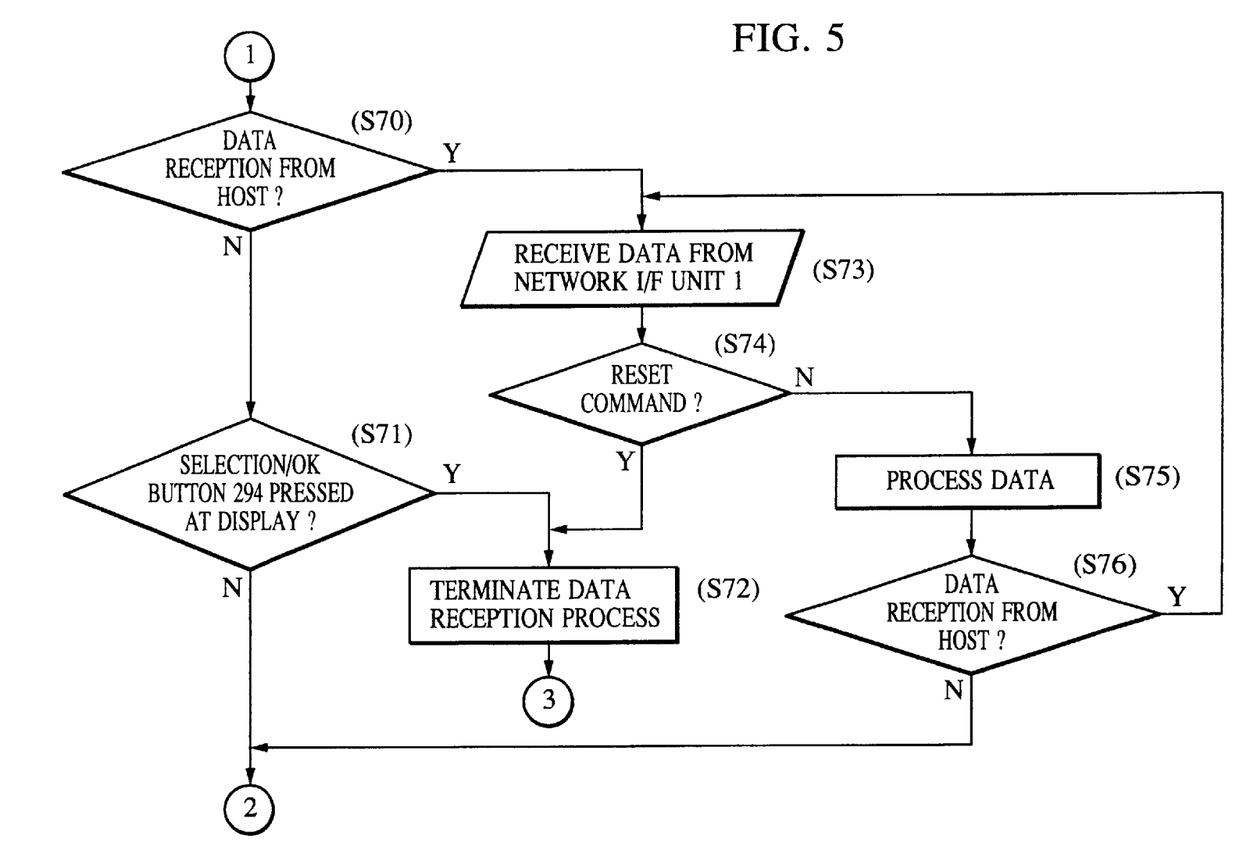
FIG. 5 is a flowchart illustrating an example of the data processing steps of the output control device relating to the present invention.

FIG. 4 and FIG. 5 are flowcharts illustrating an example of the data processing steps of the output control device relating to the present invention. (S50) through (S59) and (S70) through (S76) illustrate the steps.

When the power switch of the electrical power device 6 is turned ON, the printer is started up (S50). CPU 21 performs initial setting according to the contents stored in the F/W ROM 28 (S51), and then an instruction for performing printer setting is issued by the CPU 21 of the drawing unit 2 to the command communication unit 13 of the network I/F 1 via the I/O controller 22. The command communication unit 13, upon receiving the instruction, gives an instruction to the protocol control unit 11 via the data surveillance unit 12 to connect (login) to the computer having the IP address set beforehand by the server setting unit 14. Once connection has been successfully made, the certain setting information file is downloaded, and the setting information is brought to the data surveillance unit 12 via the protocol control unit 11 (S52).

The data surveillance unit 12 decodes the setting information file and converts it into a plurality of commands in a format that the drawing unit 2 can understand, and sends this into the command communication unit 13. The I/O controller 22 of the drawing unit 2 receives printer setting commands while making communication with the drawing unit 2, and the CPU 21 performs printer setting based thereupon to the EEPROM 23 (S53).

In the above-described first embodiment, the arrangement described involved the timing of the network I/F unit 1 logging into the server computer 54 as being the point at which electrical power is turned on, but the present invention is by no means limited to timing at the point at which electrical power is turned on, rather, it is obvious that even in the state of the electrical power being on, setting information files can be downloaded and printer setting commands provided in the same manner, by issuing a reset command. The following is a description of such an embodiment with reference to FIG. 4 and FIG. 5.

The following is a description of the section wherein the network I/F unit 1 logs into the server computer 54.

The reset command can be given from either the client computers 51 through 53 on the network, or by using the operating panel 29.

In the event that a reset command has been provided from the client computers 51 through 53 on the network, as shown in the flowchart of data reception from the host computer at the drawing unit 2 shown in FIG. 5, in the event that data is received from the network I/F unit 1 (S73), data receiving processing is terminated (S72), and downloading of the information setting file described above and shown in FIG. 4 (S52) and issuing of a printer setting command (S53) are carried out.

On the other hand, in the event that step (S74) yields NO, data processing is performed (S75), judgment is made whether or not there is data reception from the host (S76); in the event that the answer is NO, the system returns to step (S54), while in the event that the answer is YES, the system returns to step (S73).

In step (S54), judgment is made regarding whether or not the online button 292 has been depressed, and in the event that the answer is YES, menu setting processing is executed (S58), processes such as printing are carried out, and the system proceeds to step (S70).

On the other hand, in step (S54), in the event that it is judged that the online button 292 is not depressed, judgment is made regarding whether or not the menu button 293 has been depressed (S55), and in the event that the answer is YES, menu setting processing is executed (S58), processes such as printing are carried out, and the system proceeds to step (S70).

On the other hand, in step (S55), in the event that it is judged that the menu button 292 is not depressed, judgment is made regarding whether or not the select/OK button 294 has been depressed (S56), and in the event that the answer is YES, menu setting processing is executed (S58), processes such as printing are carried out, and the system proceeds to step (S70).

On the other hand, in step (S56), in the event that it is judged that the menu button 293 is not depressed, judgment is made regarding whether or not the escape button 293 has been depressed (S57), and in the event that the answer is YES, menu setting processing is executed (S58), processes such as printing are carried out, and the system proceeds to step (S70), while if the event that the answer is NO, the system proceeds to step (S59).

Thus, in order to reset using the operating panel, as shown in FIG. 3, in the state of the display panel 291 displaying "Ready", the offline button 292 is pressed (S31) to set the system in the "OFFLINE" state, and the menu button 293 is pressed until "Reset" is displayed (S32 through S42). Once the display panel 291 displays "Reset", pressing the select/OK button 294 (S43) causes the system to perform the processing of step (S72) in the same manner as of the CPU 21 had received the reset command via the I/O controller 22 in step (S71) of FIG. 5.

As described above, by means of setting server computer connection information such as IP addresses and so forth in the network I/F 1 beforehand, and placing a information setting file on the server computer 54 containing information such as the standard printer font, the size thereof, the paper tray, etc., the network I/F unit 1 logs into the server computer 54 at the time of electrical power startup, or issuing of a reset command, and downloads the information setting file for the printer, converts this to printer setting commands for a plurality of printers, and sends this to the drawing unit, and thereby setting of a plurality of network printers is facilitated.

Now, the correspondence with the steps of the present embodiment and the sixth and seventh aspects of the present invention, and the operations thereof, will be described with reference to FIG. 4, FIG. 5, and others.

According to a sixth aspect of the present invention, an output control method, which involves communicating via a certain communication medium (network 4) with a plurality of host computers (51 through 54) and also with output apparatuses having drawing units which draw image data capable of being output from the output unit based on output information from the host computers and processes output requests, comprises: an obtaining step (step (S52) in FIG. 4) for obtaining a setting information file to be set to the drawing unit from one of the host computers at a certain timing; and a transferring step (step (S53) in FIG. 4) for analyzing the obtained setting information file and transferring commands to the drawing unit (drawing unit 2), this control program being stored in an unshown CPU, ROM, or some other unshown memory resource. Thus, a setting information file to be set to the drawing unit can be obtained from one of the host computers at an appropriate timing as well as automating the setting of the various items regarding the drawing unit of the printing apparatus on the network, thereby greatly reducing the load of the setting operations of the various items corresponding to the printing apparatuses in order to match the requests from each host computer.

According to a seventh aspect of the present invention, a storage medium stores a program readable by computer, which involves communicating via a certain communication medium with a plurality of host computers and also with output apparatuses having drawing units which draw image data capable of being output from the output unit based on output information from the plurality of host computers, the program stored by the storage medium comprising: an obtaining step (step (S52) in FIG. 4) for obtaining a setting information file to be set to the drawing unit from one of the host computers at a certain timing; and a transferring step (step (S53) in FIG. 4) for analyzing the obtained setting information file and transferring commands to be set to the drawing unit, to the drawing unit, i.e., an arrangement wherein the later-described external storage medium or internal memory resource has stored therein program code corresponding with the steps shown in FIG. 4 and FIG. 5, so that an unshown CPU reads out the program code from the storage medium on which the program code is stored and executes the program code, is also included in the embodiment of the present invention. Also, the timing for this is at the time of electric power startup, the time of receiving a reset command from the host computers, and/or the time of a reset instruction from the operation panel 29.

Also, regarding the above embodiment, description has been made according to an arrangement wherein the information setting file is processed as a single common file for each of the host computers, but the arrangement may be such that a plurality of information setting files (information setting files with differing paper sizes, differing font sizes, etc.) are set at the server computer 54, allowing freely interchangeable control (including control of whether this control is valid or null) of the information setting files to be set to the drawing unit 2 based on certain conditions (differing hosts, differing reset command instruction destinations, etc.).

Figure 6:
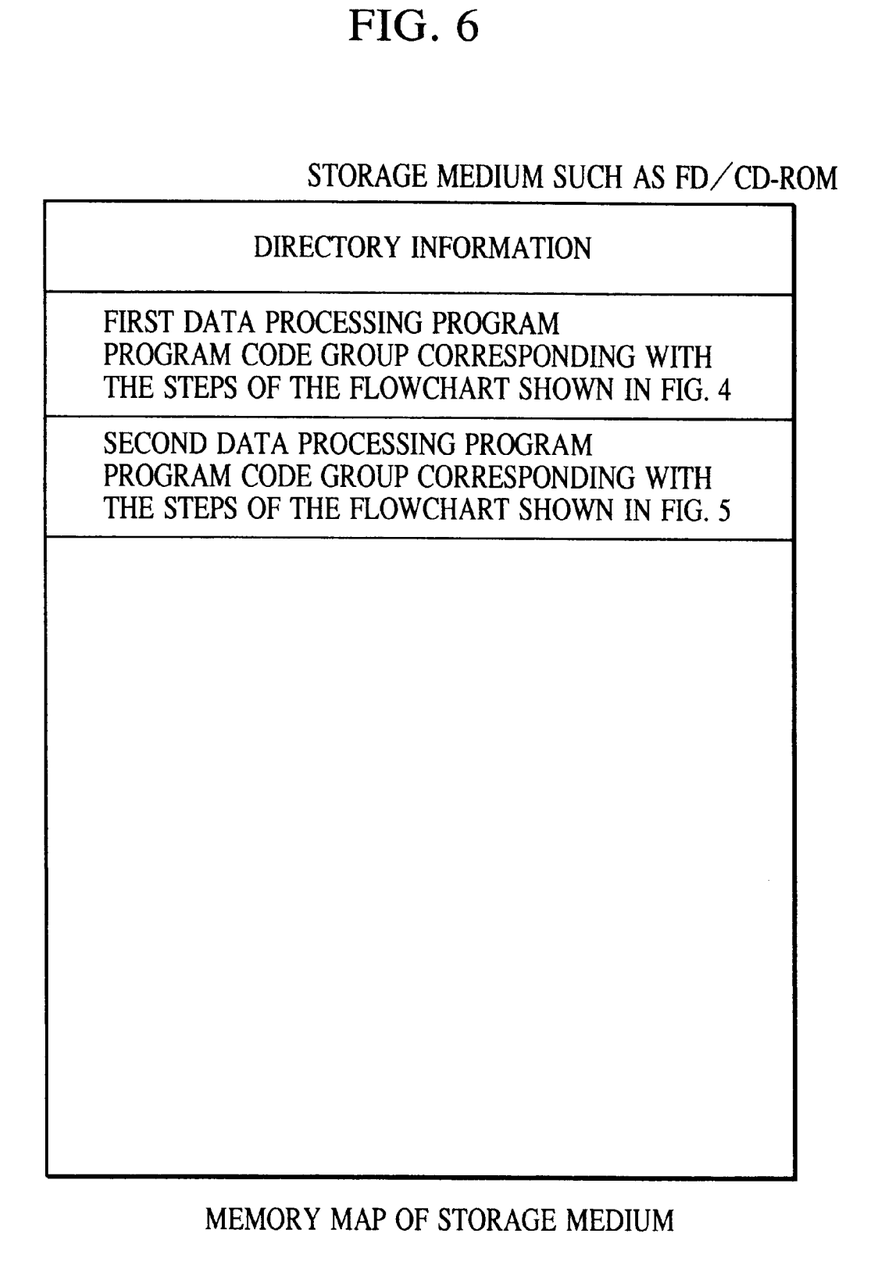
FIG. 6 is a diagram describing the memory map of the storage medium for storing various data processing programs which can be read by the output control device relating to the present invention.

The following is a description of the configuration of a data processing program which can be read with the output control device according to the present invention, with reference to the memory map shown in FIG. 6.

FIG. 6 is a diagram describing the memory map of the storage medium for storing various data processing programs which can be read by the output control device relating to the present invention.

Although not shown in the Figure, information for managing the program group stored on the storage medium such as version information and author information is stored therein, and there may be arrangements wherein information dependent on the operating system and the like of the program reading side such as program discerning icons and the like is also stored therein.

Further, data dependent on the programs is also managed in the above-described directory. Also, there may be cases wherein programs for installing the programs or programs for decompressing the programs (in the event the programs are compressed) are also stored therein.

The functions according to the present embodiment shown in FIG. 4 and FIG. 5 may be carried out by the host computer by means of an externally installed program. In such a case, the present invention is also applicable regarding cases wherein an information group, including programs is supplied to the output device by means of storage medium such as CD-ROM, flash memory, floppy disk, or the like, or from an external storage medium via a network.

As can be clearly understood from the foregoing, the objects of the present invention are achieved by supplying a storage medium upon which is recorded software program code capable of realizing the functions of the above-described embodiments in a system or device, a computer (or CPU or MPU) of the system or device reading and executing the program code stored in the storage medium.

In this case, the program code itself read from the storage medium realizes a new function according to the present invention, and the storage medium which stores the program code comprises part of the present invention.

Examples of storage medium which may be used for supplying the include, e.g., floppy disk, hard disk, optical disk, optical-magnetic disk, CD-ROM, CD-R, magnetic tape, non-volatile memory card, ROM, EEPROM, etc.

Also, it is needless to say that the present invention includes cases wherein not only are the functions of the above-described embodiments realized by means of executing the program code which the computer has read, but the operating system or the like operating on the computer performs part or all of the actual processing based on the instructions of the program code, this processing realizing the functions of the embodiments.

Further, it is needless to say that the present invention includes cases wherein, following the program code read from the storage medium being written to the memory provided on function-extension boards inserted in the computer or function-extension units connected to the computer, the CPU or the like provided to the function-extension board or the function-extension unit performs part or all of the actual processing based on the instructions of the program code, this processing realizing the functions of the aforementioned embodiments.

As described above, according to a first aspect of the present invention, obtaining means obtain a setting information file to be set to the drawing unit from one of the host computers at a certain timing, the setting information file is analyzed and converted into commands to be set to the drawing unit by converting means, and the converted commands are transferred to the drawing unit by communication means. Thus, a setting information file to be set to the drawing unit can be obtained from one of the host computers at an appropriate timing as well as automating the setting of the various items regarding the drawing unit of the printing apparatus on the network, thereby greatly reducing the load of the setting operations of the various items corresponding to the printing apparatuses in order to match the requests from each host computer.

According to a second aspect of the present invention, the setting means sets a host computer from which to obtain the setting information file and the obtaining means obtains the setting information file at a certain timing, so that the candidate for the host computer from which to obtain the setting information file to be set to the drawing unit can be freely set, and can be obtained in a sure manner from that host computer regarding which a setting information file has been set to be set to the drawing unit, at an appropriate timing.

According to a third aspect of the present invention, the certain timing is made to be upon startup of electrical power, so that the information file to be set to the drawing unit can be obtained from the set host computer in a sure manner each time there is electrical power startup.

According to a fourth aspect of the present invention, the certain timing is upon reception of a reset command from any of the host computers, so that the information file to be set to the drawing unit can be obtained from the set host computer in a sure manner each time there is reception of a reset command.

According to a fifth aspect of the present invention, the certain timing is upon a reset instruction from the operating panel of the output apparatus, so that the information file to be set to the drawing unit can be obtained from the host computer in a sure manner each time there is a reset instruction from the operating panel of the output apparatus.

According to sixth and seventh aspects of the present invention, a setting information file to be set to the drawing unit is obtained from one of the host computers at a certain timing, and the obtained setting information file is analyzed and commands to be set to the drawing unit are transferred. Thus, a setting information file to be set to the drawing unit can be obtained from one of the host computers at an appropriate timing as well as automating the setting of the various items regarding the drawing unit of the printing apparatus on the network, thereby greatly reducing the load of the setting operations of the various items corresponding to the printing apparatuses in order to match the requests from each host computer.

Accordingly, in a situation wherein a plurality of host computers share printing apparatuses connected to a network, each setting operation item for the drawing unit of the printing apparatuses is automated, thereby markedly decreasing the operational load of the administrator overseeing the printing apparatuses.

What is claimed is:

1. An output control device which communicates via a network with a plurality of computers and outputs print data from at least one of the plurality of computers to an output apparatus having a drawing unit which draws image data capable of being output by the output apparatus based on the print data, said output control device comprising:

an operation panel for selecting at least one setting value of a plurality of setting items of the output control device, said selected setting value including at least a paper setting for the output control device;

a connection controller that accesses at least one of the plurality of computers via the network at a predetermined timing;

a file retriever that operates to obtain spontaneously a setting information file including a plurality of print settings to be set to said drawing unit from the at least one of the plurality of computers accessed by said connection controller via the network, the setting information being obtained independently of the print data from the at least one of the plurality of computers; and a print setter that sets print settings to said drawing unit, wherein said print setter is operable to set print settings based on either one of both the setting information file obtained by said file retriever and the setting value selected by said operation panel, wherein the plurality of setting items are displayed in a hierarchical menu.

2. An output control device according to claim 1, further comprising setting means for setting an IP address of the computer from which to obtain the setting information file, wherein said file retriever sends a request for the setting information file and downloads the setting information file to be set to said drawing unit from the one host computer set by said setting means.

3. An output control device according to claim 1, wherein said predetermined timing is upon startup of electrical power.

4. An output control device according to claim 1, wherein said predetermined timing is upon reception of a reset command from any of the host computers.

5. An output control device according to claim 1, wherein said predetermined timing is upon a reset instruction from the operating panel of said output apparatus.

6. An output control device according to claim 1, further comprising:

converting means for analyzing the setting information file obtained by said file retriever and converting that setting information file to commands to be set to said drawing unit; and communication means for transferring the commands converted by said converting means to said one drawing unit, wherein said print setter sets the print settings to said drawing unit on the basis of said command transferred by said communication means.

7. An output control device according to claim 1, wherein said setting information file includes at least font information, paper size information and paper tray information.

8. An output control method which involves communicating via a network with a plurality of computers and outputting print data from at least one of the plurality of computers to an output apparatus having a drawing unit which draws image data capable of being output by the output apparatus based on the print data, said output control method comprising the steps of:

selecting at least one setting value of a plurality of setting items, said selected setting value including at least a paper setting;

accessing at least one of the plurality of computers via the network at a predetermined timing;

obtaining spontaneously a setting information file including a plurality of print settings to be set to the drawing unit from the at least one of the plurality of computers accessed in said accessing step, the setting information being obtained independently of the print data from the at least one of the plurality of computers; and setting print settings to the drawing unit, wherein printer settings are set based on either one of both of the setting information file obtained in said obtaining step and the selected setting value, wherein the plurality of setting items are displayed in a hierarchical menu.

9. A storage medium storing a program readable by computer, which involves communicating via a network with a plurality of computers and outputting print data from at least one of the plurality of computers to an output apparatus having a drawing unit which draws image data capable of being output by the output apparatus based on the print data, the program stored by said storage medium executing a method comprising the steps of:

selecting at least one setting value of a plurality of setting items, said selected setting value including at least a paper setting;

accessing at least one of the plurality of computers via the network at a predetermined timing;

obtaining spontaneously a setting information file including a plurality of print settings to be set to the drawing unit from the at least one of the plurality of computers accessed in said accessing step, the setting information being obtained independently of the print data from the at least one of a plurality of computers; and setting the print settings to the drawing unit, wherein said print settings are set based on either one or both of the setting information file obtained in said obtaining step and the selected setting value, wherein the plurality of setting items are displayed in a hierarchical menu.

10. A network interface device which communicates via a network with a plurality of computers and connects an output apparatus having a drawing unit which draws an image based on print data from the network, said network interface device comprising:

an operation panel for selecting at least one setting value of a plurality of setting items of the network interface device, said selected setting value including at least a paper setting for the network interface device;

a connection controller that accesses at least one of the plurality of computers via the network at a predetermined timing;

a file retriever that operates to obtain spontaneously a setting information file including a plurality of print settings from the at least one of the plurality of computers accessed by said connection controller via the network, the setting information being obtained independently of the print data from the at least one of a plurality of computers; and a communication unit that communicates with said output apparatus and transmits print settings to said output apparatus so that print settings are set to said drawing unit, wherein said print settings are based on either one or both of said setting information file obtained by said file retriever and the setting value selected by said operation panel, wherein the plurality of setting items are displayed in a hierarchical menu.

11. A network interface method which communicates via a network with a plurality of computers and connects an output apparatus having a drawing unit which draws an image based on print data from the network, said network interface method comprising the steps of:

a selecting step that selects at least one setting value of a plurality of setting items, said selected setting value including at least a paper setting;

a connection controlling step that accesses at least one of the plurality of computers via the network at a predetermined timing;

a file retrieving step that operates to obtain spontaneously a setting information file including a plurality of print settings from the at least one of the plurality of computers accessed by said connection controlling step via the network, the setting information being obtained independently of the print data from the at least one of a plurality of computers; and a communication step that communicates with said output apparatus and transmits print settings to said output apparatus so that the print settings are set to said drawing unit, wherein said print settings are based on either one or both of said setting information file obtained by said file retriever and the setting value selected by said selecting step, wherein the plurality of setting items are displayed in a hierarchical menu.

* * * * *

UNITED STATES PATENT AND TRADEMARK OFFICE
CERTIFICATE OF CORRECTION

PATENT NO. : 6,731,394 B1  
APPLICATION NO. : 08/995907  
DATED : May 4, 2004  
INVENTOR(S) : Tanabe Page 1 of 1

It is certified that error appears in the above-identified patent and that said Letters Patent is hereby corrected as shown below:

TITLE PAGE:
(30) Foreign Application Priority Data, "8/351015" should read -- 8-351015 --.

COLUMN 3:
Line 29, "form" should read -- from --.

COLUMN 5:
Line 13, "it" should read -- it to --.

COLUMN 9:
Line 8, "used for supplying the" should read -- used --.

Signed and Sealed this

Seventeenth Day of October, 2006

JON W. DUDAS
*Director of the United States Patent and Trademark Office*